Aug. 29, 1967     J. H. GOLATA ET AL     3,338,342
DUAL TRACK BRAKE

Filed April 19, 1965     3 Sheets-Sheet 1

INVENTORS
JOHN H. GOLATA &
RAYMOND J. WILCOX
BY
Barnes, Kisselle, Raisch, & Choate
ATTORNEYS INVENTORS
JOHN H. GOLATA &
RAYMOND J. WILCOX
BY
Barnes, Kisselle, Raisch & Choate
ATTORNEYS

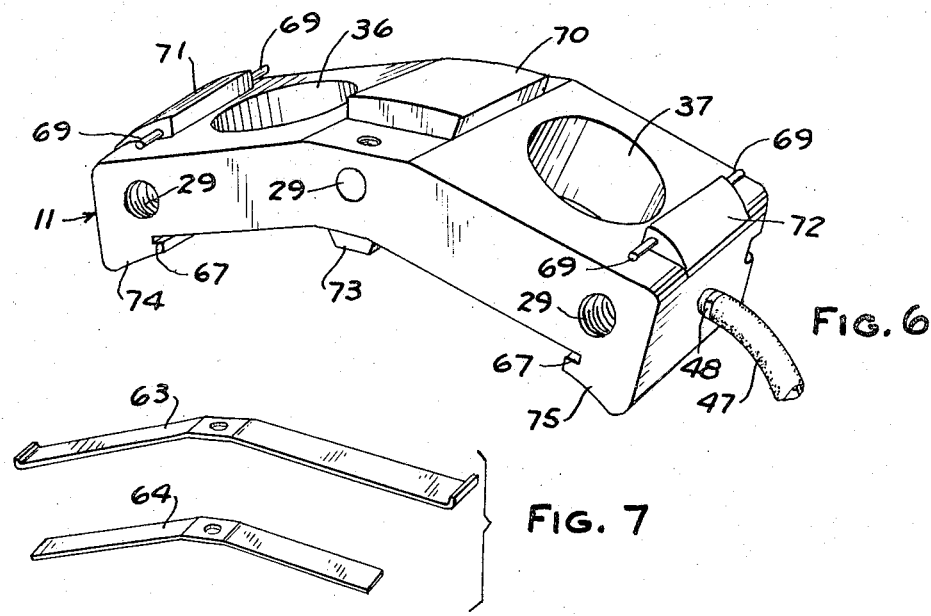
FIG. 6
FIG. 7
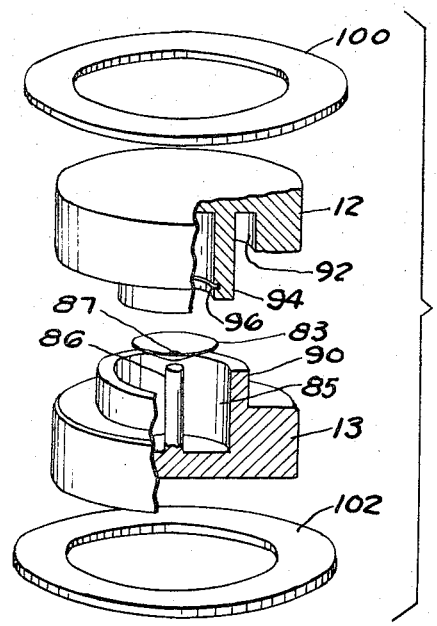
FIG. 8

United States Patent Office 3,338,342
Patented Aug. 29, 1967

3,338,342
DUAL TRACK BRAKE
John H. Golata, Lansing, Mich., and Raymond J. Wilcox, Pasadena, Calif., assignors to Motor Wheel Corporation, Akron, Ohio, a corporation of Ohio
Filed Apr. 19, 1965, Ser. No. 448,927
10 Claims. (Cl. 188—78)

ABSTRACT OF THE DISCLOSURE

A dual track drum brake wherein the drum has concentric outer and inner cylindrical brake tracks joined at one edge to a back and free at the other end edges thereof. A brake cylinder unit is disposed between the tracks and has a pair of cylinder bores extending radially of the drum each containing inner and outer pistons which move radially of the drum and are forced apart by hydraulic pressure to drive associated inner and outer brake pads into frictional braking engagement with the inner and outer tracks respectively.

---

This invention relates generally to brakes, and in particular to a dual track drum brake.

An object of this invention is to provide a drum brake which will tolerate limited warpage of the drum without substantial brake fading.

Another object of the invention is to arrange braking pistons between two annular tracks of a brake drum so as to facilitate actuation of all pistons from a common source of hydraulic fluid.

Yet another object of the invention is to facilitate adjustment of the initial positions of oppositely acting pistons in a dual track brake.

Other objects of the invention are to improve the coupling of lining pads to pistons in a manner allowing easy replacement of the lining pads; to provide a simple, rugged and reliable structure for a dual track brake; and to facilitate cooling of a dual track drum brake.

Other objects, features and advantages of the present invention will become apparent from the following detailed description taken in conjunction with the accompanying drawings wherein:

FIG. 6 is a perspective view of a cylinder block which receives the pistons.

FIG. 7 shows two springs for yieldably securing the brake pads to the pistons and for returning the pads and pistons to an initial position after release of hydraulic pressure.

FIG. 8 is an exploded perspective view of two of the pistons, and associated parts included in the brake.

Figure 1:
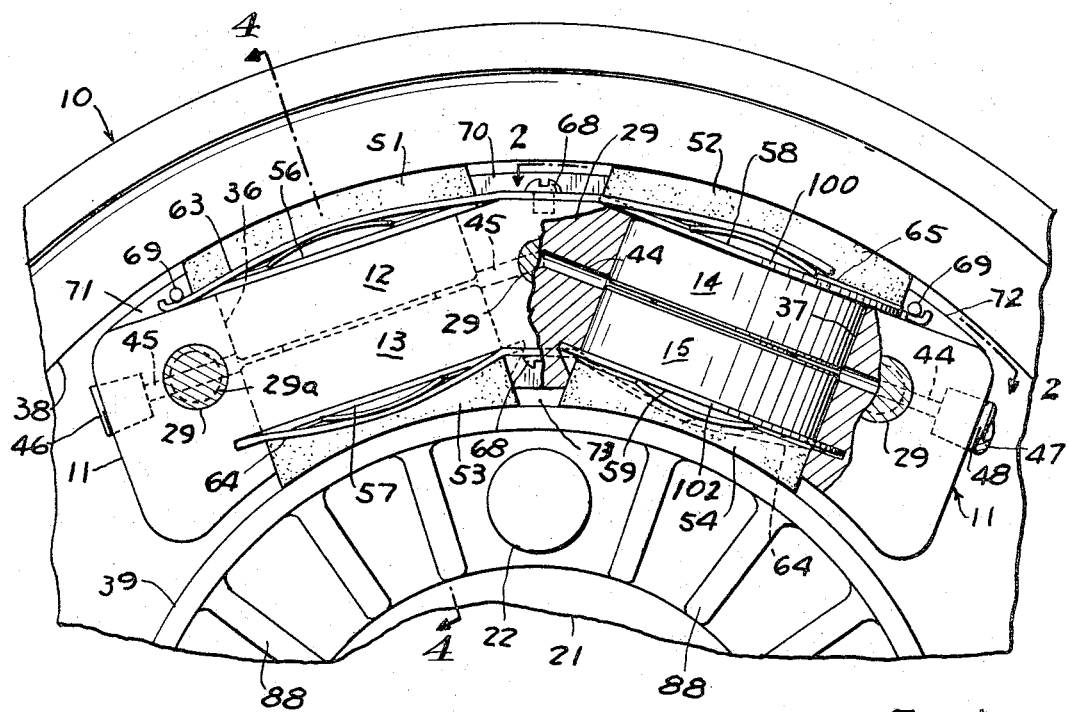
FIG. 1 is a fragmentary elevational view of a portion of a dual track brake looking into the open end of the drum.
Figure 4:
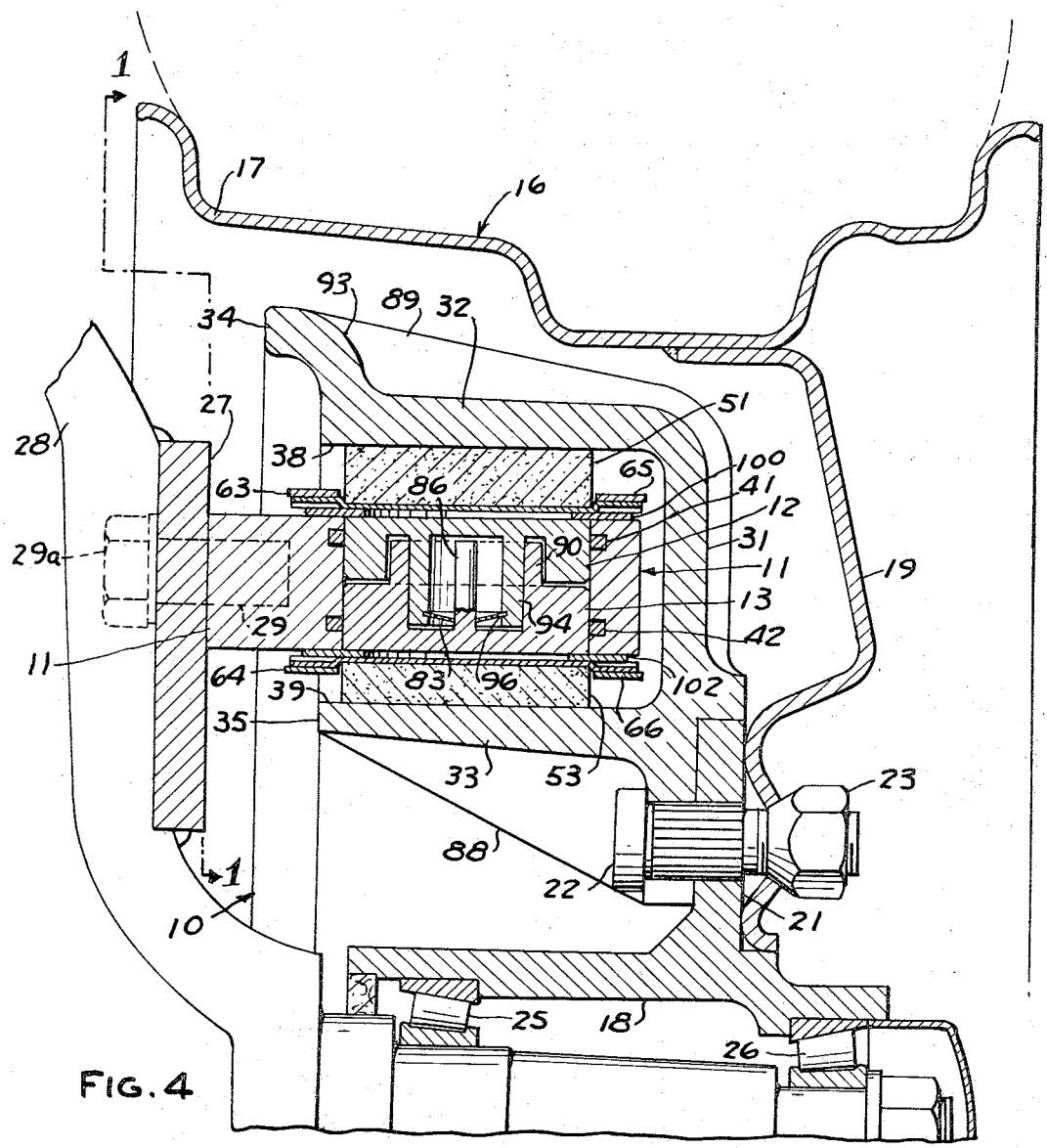
FIG. 4 is a sectional view taken along line 4—4 of FIG. 1 to illustrate the internal structure of two pistons and their relation to two braking tracks of the brake drum as well as the mounting structure for the brake.

Referring to FIGS. 1 and 4, there is shown a portion of a dual track brake which includes a brake drum 10, a unitary cylinder block 11, and four pistons 12, 13, 14 and 15 within the cylinder block. A conventional wheel 16 (FIG. 4) has a rim 17 of the drop-center type, a hub 18, and a wheel disk 19. Drum 10 is fastened by the usual bolts 22 and nuts 23 to a radial flange 21 which projects from hub 18. Hub 18 is mounted for rotation on an axle 24 by bearings 25, 26. Block 11 has three blind bores 29 in one side thereof (FIGS. 1 and 6), the center bore being smooth to receive with a press fit a dowel 29a (FIG. 4) and the two outer bores being threaded to receive bolts which secure block 11 to a knuckle plate 27 which is welded to a kingpin assembly 28 of the usual front wheel suspension system. Similar suitable attachment structure may be provided for securing block 11 to the rear axle housing in applying the present brake to a rear wheel suspension system.

Drum 10 is a unitary cast structure having a drum back 31 and outer and inner braking flanges 32 and 33 respectively which project axially from back 31 and terminate at free ends 34 and 35, respectively. Flanges 32 and 33 provide two annular concentric brake tracks 38 and 39 which face each other inside the drum. Since end 34 of outer flange 32 is free, it is possible for warpage of the type known as bell mouthing to occur in flange 34 as drum 10 is heated. However, in accordance with the present invention, the brake is designed so that end 35 of the inner flange 33 is also free so that the inner flange also bell mouths. As explained in more detail hereinafter, limited warping of this kind can occur without encountering the usually attendant brake fading problem.

As shown most clearly in FIG. 6, clock 11 is a one-piece generally arcuate member having two cylinder bores 36 and 37 extending through it for receiving pistons 12, 13, 14 and 15. As seen in FIG. 4, block 11 projects from knuckle 27 into the space betwen outer and inner flanges 32 and 33 with the axes of the bores 36 and 37 oriented radially and intersecting at the center of curvature of flanges 32, 33.

As shown in FIG. 1, one pair of pistons 12 and 13 is slidably received in bore 36 and the other pair 14 and 15 in bore 37, the pistons of a pair being free to move axially with respect to each other as well as with respect to block 11. A fluid tight seal is provided between each of the pistons and the adjacent cylinder wall by sealing rings 41 and 42 which fit in circular recesses in the cylinder wall.

Referring to FIG. 1, block 11 has intersecting passages 44 and 45 drilled longitudinally through it which respectively intersect bores 37 and 36 for introducing hydraulic fluid between both pairs of pistons from a common source of hydraulic fluid, for example, from the master cylinder of a conventional automotive hydraulic brake system. For this purpose the enlarged outer end of passage 45 is closed by a plug 46 and a brake fluid line 47 (FIGS. 1 and 6) from the master cylinder is connected by a threaded nipple 48 to the enlarged outer end of passage 44. When the hydraulic fluid in line 47 is pressurized, the pistons of a given pair move away from each other to apply braking force to drum 10.

Figures 2, 3:
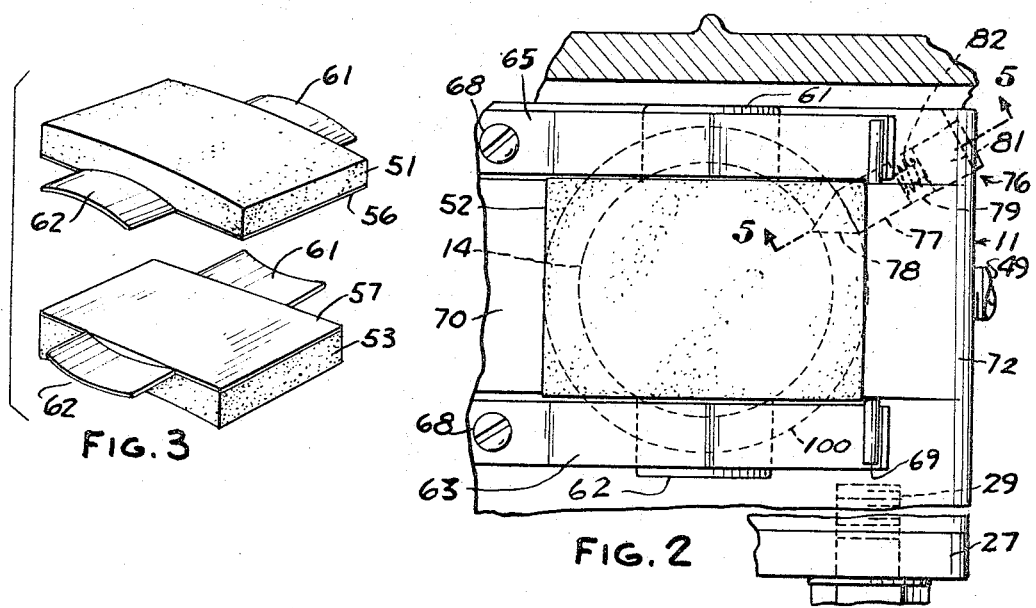
FIG. 2 is a sectional view taken along line 2—2 of FIG. 1 showing one of the brake pads and the adjoining structure.
FIG. 3 shows two of the brake pads in perspective.

The braking force is applied by four brake pads 51, 52, 53 and 54 made of suitable brake lining material. These pads and the structure for connecting them to the pistons are shown in FIGS. 1, 2 and 3. The pads have backing plates 56, 57, 58 and 59 suitably secured to them as by an adhesive. Each backing plate has two curved ears 61, 62 projecting from opposite sides thereof which are individually engaged by springs 63, 64, 65 and 66 which comprise flat spring metal strips disposed to run lengthwise along block 11 and overlie the ears. One spring of each inner and outer pair of these springs is shown more clearly in FIG. 7. The central portion of each spring is fastened to the cylinder block by means of screws 68 (FIG. 1). The ends of the outer pair of springs 63 and 65 are bent so as to hook under pins 69 which project from raised abutment portions 71 and 72 formed at opposite ends of block 11 on the outer side thereof (FIG. 6). The pair of inner springs 64 and 66 have flat ends which fit into recesses 67 formed on the underside of block 11 (FIG. 6). The bent ends of springs 63, 64, 65 and 66 are free to move longitudinally of block 11, thus allowing the springs to flex when the pistons are forced apart. Pads 51, 52, 53 and 54 are yieldably urged by springs 63, 64, 65 and 66 toward block 11, the springs thereby serving as return springs for pistons 12–15. The raised portions 70 prevent outer springs 63 and 65 from swiveling on screws 68 and hence the springs positively resist movement of pads 51 and 52 laterally of block 11. Inner springs 64 and 66 are retained against swiveling by the inner walls of recesses 67 and likewise provide lateral retention for pads 53, 54. Abutments 70, 71 and 72 on the outer surface of block 11 retain pads 51 and 52 against movement longitudinally of block 11 and abutments 73, 74 and 75 on the inner surface of block 11 similarly retain pads 53 and 54 against such longitudinal movement. Due to the above retention of the brake pads and pistons, block 11 and the parts assembled with it can be removed as a unit from drum 10. Worn pads can then be removed from block 11 by removing springs 63–66 to release the ears of the respective backing plates.

Figure 5:
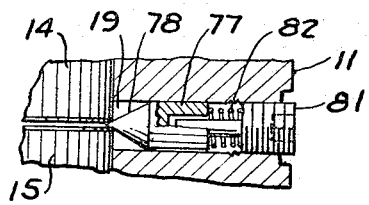
FIG. 5 is a sectional view taken along line 5—5 of FIG. 2 showing a device for adjusting the pistons.

FIGS. 2 and 5 show one form of an adjusting device 76 for setting the spacing between pistons 14 and 15 radially of drum 10 (axially of the pistons). Another identical adjusting device (not shown) is provided for the other two pistons 12 and 13. Device 76 includes a plunger 77 having a conical end 78 which projects between pistons 14 and 15. Plunger 77 is movable within a bore 79 in block 11. The exterior end of bore 79 is threaded to receive a set screw 81, and a coil spring 82 extends between plunger 77 and set screw 81. Adjustment of set screw 81 compresses spring 82 causing it to urge the pointed end of plunger 77 between pistons 14 and 15, thereby camming the pistons axially apart against the force of return springs 63, 64, 65 and 66. As the pads 51, 52, 53, 54 wear in operation, the plunger tends to increase the minimum spacing between the pistons so that the pads are maintained close to their associated brake track. Hence, a minimum of pedal travel is required for engaging the brake pads with their tracks.

A supplemental or alternative form of wear take-up device is shown in FIGS. 4 and 8 which in accordance with the present invention comprises a Belleville spring or washer 83 which is interengaged with each pair of inner and outer pistons 12 and 13. Another Belleville washer is similarly provided for pistons 14 and 15. Washer 83 has a central hole 87 through which fits a post portion 86 of piston 13 which projects upwardly from the center of a cylindrical cavity 85 of piston 13. Cavity 85 is formed by a recess in the inner surface of piston 13 and by a tubular integral extension 90 which slidably telescopes into a mating annular cavity 92 formed in the inner surface of piston 12. Piston 12 likewise has a tubular projection 94 which slidably telescopes within cavity 85 of piston 13. As shown in FIG. 4, the rim of washer 83 fits into an internal groove 96 in the interior wall of projection 94 of piston 12, and the washer is arranged on post 86 with its concave side facing the opposite piston 12. Center hole 87 is dimensioned to have a frictionally sliding fit on post 86 so that as pistons 12 and 13 are forced axially apart by brake fluid pressure, the frictional resistance is overcome and post 86 can slide through washer 83. However, as pistons 12 and 13 are forced toward one another by their return springs 63, 64, 65 and 66 upon release of braking pressure, the friction between post 86 and washer 83 tends to deflect the washer toward piston 12, thereby tending to flatten the washer. This causes the washer to bight into post 86 and thereby strongly resist such retractile movement of the pistons toward one another. Hence as the pads 51, 52, 53, 54 wear in operation, and thus permit an increase in the maximum amount of separation which can occur between the pistons, washer 83 tends to "climb" up post 86, thereby maintaining the pistons close to their maximum possible separation upon release of fluid pressure between the pistons. By thus maintaining the pads close to their associated brake tracks, brake wear is automatically taken up so that a minimum of pedal travel is required to actuate the brakes.

FIG. 8 also illustrates a pair of washers 100 and 102, washer 100 being received between piston 12 and its associated pad 51 and washer 102 between piston 13 and the associated pad 53. The backing plates 56 and 57 for pads 51 and 53 are received on washers 100 and 102 respectively. The washers overlap the outer and inner faces of block 11 and, in the retracted position of the pistons, the washers seat on the block to prevent entry of dust and dirt into the cylinder bores 36 and 37 of block 11.

The brake is operated by pressurizing the hydraulic fluid via passages 44, 45, and 46, thus separating each pair of pistons so as to engage the brake lining material with the inner and outer tracks 38, 39 of drum 10. The friction between the brake lining material of pads 51, 52, 53 and 54 and tracks 38 and 39 generates heat which raises the temperature of the flanges 32 and 33. Much of this heat is dissipated by a series of circumferentially spaced axially extending ribs or fins 88 and 89 which are integrally joined to flanges 33 and 32 respectively. Cooling is also materially aided by the relatively large area of tracks 38 and 39 compared to the area of the pads 51, 52, 53 and 54. However, it is still possible for flanges 32 and 33 to bell mouth due to differential expansion between the free and restrained ends of flanges 32 and 33. This distortion is actually used to advantage in the present invention. Thus, each of the flanges 32 and 33 has a free end and the flanges preferably are arranged with their free ends on the same side of drum back 31 so that the flanges tend to warp in the same way. Hence, the radial distance between tracks 38 and 39 stays approximately constant due to inner track 39 "following" outer track 38 as both flanges bell mouth. Since this radial distance determines piston travel, the piston travel will not vary substantially with bell mouthing. Consequently a given brake pressure will produce substantially the same braking power in both the unwarped and the warped conditions of the brake flanges. As a result, brake fading does not occur to an undesirable extent. In the warped condition, inner flange 33 is closer to pads 53 and 54 than outer flange 32 is to pads 51 and 52 and so pads 53 and 54 will engage inner flange 33 before outer flange 32 is engaged. However, due to each piston being the reaction member for the other, no substantial braking force will be exerted until all four pads engage the brake flanges.

The outer flange 32 is reinforced by a bead 93 formed integrally therewith at its free end 34 and is further reinforced by fin ribs 89. Inner flange 33 is reinforced by fin ribs 88 but has no bead. The greater reinforcing for outer flange 32 compensates for its greater tendency to bell mouth due to its larger circumference. For the same reason, ribs 89 are widest adjacent bead 93 and taper to a narrower dimension adjacent drum back 31 so that the greatest reinforcement exists near the free end 34 of flange 32. On the other hand, ribs 88 are narrowest at free end 35 and taper to a wider dimension at disk 31, so fins 88 reinforce free end 35 less than fins 89 reinforce free end 34. In this manner, the distortion of flanges 33 and 35 is not only kept within reasonable limits but is also compensated as between the inner and outer flanges so that their radial spacing remains substantially constant during heat induced distortion.

It is evident from the foregoing description that dual track brakes in accordance with the invention have several advantages over known brakes. The provision of a brake cylinder unit having oppositely acting brake linings between radially separated annular tracks of a drum facilitates cooling of the drum and minimizes brake fading due to bell mouthing. Any tendency for the inner and outer tracks of the drum to bell mouth unequally may be compensated by reinforcing a free end of the outer track more than the inner track. The brake linings may be driven by pistons hydraulically actuated from a common source of hydrualic fluid. Since the pistons of a given pair act oppositely, their initial positions may be adjusted by means of a simple adjustable separator which acts on both pistons. Springs for returning the pistons and brake lining pads to their initial positions after they have been actuated may serve the additional function of holding the pads and pistons together. The brake cylinder and piston unit is readily accessible for servicing upon removal of the wheel, and when worn the friction pads may be easily removed and replaced by new pads.

We claim:

1. A dual track brake comprising a brake drum having a back and inner and outer annular members joined to said back and separated from each other radially of said drum, said annular members extending in the same transverse direction from said back and terminating at free ends, said outer annular member having a radially inward-facing surface constituting one braking track and said inner annular member having a radially outward-facing surface constituting another braking track, a brake unit including first and second brake lining means between said tracks movable radially of said drum and oppositely relative to each other into engagement with said inner and outer tracks respectively, means yieldably urging said brake lining means toward each other out of engagement with said tracks and means for moving said first and second brake lining means away from each other into braking engagement with said respective tracks, said means for moving said lining means comprising support means disposed in fixed position relative to the rotational axis of said drum, a cylinder block secured to said support means and disposed between said tracks and having a bore extending therethrough generally radially of said tracks, first and second pistons slidably received in said bore for movement axially thereof, means including a pressure fluid chamber between said pistons for hydraulically driving said pistons apart toward the respectively adjacent tracks, said first and second brake lining means being respectively carried by said first and second pistons, said drum having first means reinforcing said inner annular member and second means reinforcing said outer annular member to a greater extent than said first means reinforces said inner annular member, said second reinforcing means including a plurality of outer fins spaced circumferentially about said outer annular member and tapering from a larger radial dimension adjacent said free end thereof to a smaller radial dimension adjacent said back, and said first reinforcing means including a plurality of inner fins spaced about the inner circumference of said inner annular member and tapering from a smaller radial dimension adjacent said free end thereof to a larger radial dimension adjacent said back.

2. The dual track brake drum of claim 1 in which said first reinforcing means further includes a bead at said free end of said outer annular member of said drum.

3. A dual track brake comprising a brake drum having a back and inner and outer annular members joined to said back and separated from each other radially of said drum, said annular members extending in the same transverse direction from said back and terminating at free ends, said outer annular member having a radially inward-facing surface constituting one braking track and said inner annular member having a radially outward-facing surface constituting another braking track, a brake unit including first and second brake lining means between said tracks movable radially of said drum and oppositely relative to each other into engagement with said inner and outer tracks respectively, means yieldably urging said brake lining means toward each other out of engagement with said tracks and means for moving said first and second brake lining means away from each other into braking engagement with said respective tracks comprising a cylinder block having at least one bore therein extending between said inner and outer tracks, a pair of pistons in said bore responsive to pressure applied therebetween to move said first and second brake lining means oppositely into engagement with said inner and outer tracks respectively, said one of said pistons having a post extending therefrom towards the other piston of said pair and said other piston having means defining a cavity adapted to receive said post in spaced non-contacting relation therein, and a dished washer having an aperture slidably receiving said post therethrough, said washer engaging the wall of said cavity at the periphery of said washer, said washer being oriented with its concave side facing said other piston.

4. A dual track brake comprising a brake drum having a back and inner and outer annular members joined to said back and separated from each other radially of said drum, sid annular members extending in the same transverse direction from said back and terminating at free ends, said outer annular member having a radially inward-facing surface constituting one braking track and said inner annular member having a radially outward-facing surface constituting another braking track, a brake unit including first and second brake lining means between said tracks movable radially of said drum and oppositely relative to each other into engagement with said inner and outer tracks respectively, means yieldably urging said brake lining means toward each other out of engagement with said tracks, said brake unit including a block having a generally arcuate configuration to accommodate the curvature of said tracks and having first bore therein extending between said inner and outer tracks, a pair of pistons in said first bore responsive to pressure applied therebetween to move said first and second brake lining means oppositely into engagement with said inner and outer tracks respectively, third and fourth brake lining means between said tracks movable radially of said drum and oppositely relatively to each other into engagement with said inner and outer tracks respectively, said block having a second bore therein extending between said inner and outer tracks and spaced at an acute angle from said first bore, and another pair of pistons in said second bore responsive to pressure therebetween to move said third and fourth brake lining means oppositely into engagement with said respective tracks.

5. The dual track brake of claim 4 in which said block has passage means therein for supplying hydraulic fluid to said bores from a common external source of hydraulic fluid.

6. A dual track brake comprising a brake drum having a back and inner and outer annular members joined to said back and separated from each other radially of said drum, said annular members extending in the same transverse direction from said back and terminating at free ends, said outer annular member having a radially inward-facing surface constituting one braking track and said inner annular member having a radially outward-facing surface constituting another braking track, a brake unit including first and second brake lining means between said tracks movable radially of said drum and oppositely relative to each other into engagement with said inner and outer tracks respectively, means yieldably urging said brake lining means toward each other out of engagement with said tracks and means for moving said first and second brake lining means away from each other into braking engagement said said respective tracks comprising a cylinder block having a first bore therein extending between said inner and outer tracks, a pair of pistons in said bore responsive to pressure applied therebetween to move said first and second brake lining means oppositely into engagement with said inner and outer tracks respectively, third and fourth brake lining means between said tracks movable radially of said drum and oppositely relatively to each other into engagement with said inner and outer tracks respectively, said block having a second bore therein extending between said inner and outer tracks and spaced at an acute angle from said first bore, another pair of pistons in said second bore responsive to pressure therebetween to move said third and fourth brake lining means oppositely into engagement with said respective tracks, a first pair of leaf springs slidably retained by said block urging said first and third brake lining means toward respective pistons and serving as return springs therefor, and a second pair of leaf springs slidably retained by said block urging said second and fourth brake lining means toward respective pistons and serving as return springs therefor.

7. A dual track brake comprising a brake drum having a back and inner and outer annular members joined to said back and separated from each other radially of said drum, said members projecting in the same transverse direction from said back and terminating at free ends, the outer member having a radially inward-facing surface constituting one braking track and the inner member having a radially outward-facing surface constituting another braking track, a cylinder block supported in a position between said tracks and having at least one cylinder bore extending through the same radially of said members, a pair of pistons in said cylinder bore, brake lining material adjacent each said piston at a portion thereof facing one of said braking tracks, means forming a fluid-tight seal between each said piston and the wall of the corresponding cylinder bore, said pistons defining with said cylinder bore a fluid chamber between said pistons for receiving hydraulic fluid adapted to be pressurized to move said pistons away from each other to thereby engage said brake lining material with said braking tracks, means for returning the pistons of said pair toward each other, a plunger movable in said cylinder block, said plunger having a tapering portion with a narrow end located between said pistons and acting as a stop for setting the spacing between said pistons, an adjustment screw threadedly mounted in said block and movable axially of said plunger and a spring between said screw and said plunger urging said plunger toward said pistons.

8. A dual track brake comprising a brake drum having a back and inner and outer annular members joined to said back and separated from each other radially of said drum, said members projecting in the same transverse direction from said back and terminating at free ends, the outer member having a radially inward-facing surface constituting one braking track and the inner member having a radially outward-facing surface constituting another braking track, a cylinder block supported in a position between said tracks and having at least one cylinder bore extending through the same radially of said members, a pair of pistons in said cylinder bore, brake lining material adjacent each said piston at a portion thereof facing one of said braking tracks, means forming a fluid-tight seal between each said piston and the wall of the corresponding cylinder bore, said pistons defining with said cylinder bore a fluid chamber between said pistons for receiving hydraulic fluid adapted to be pressurized to move said pistons away from each other to thereby engage said brake lining material with said braking tracks, means for returning the pistons of said pair toward each other, and means connecting said brake lining material to said pistons comprising a backing plate secured to said lining material having transversely projecting ears and a pair of leaf springs for each said piston retained by said cylinder block and extending over said ears to urge said backing plate toward said piston.

9. A dual track brake comprising a brake drum having a back and inner and outer annular members joined to said back and separated from each other radially of said drum, said members projecting in the same transverse direction from said back and terminating at free ends, the outer member having a radially inward-facing surface constituting one braking track and the inner member having a radially outward-facing surface constituting another braking track, a cylinder block supported in a position between said tracks and having at least one cylinder bore extending through the same radially of said members, a pair of pistons in said cylinder bore, said block comprising a unitary member having a generally arcuate configuration to accommodate the curvature of said tracks, brake lining material adjacent each said piston at a portion thereof facing one of said braking tracks, means forming a fluid-tight seal between each said piston and the wall of the corresponding cylinder bore, said pistons defining with said cylinder bore a fluid chamber between said pistons for receiving hydraulic fluid adapted to be pressurized to move said pistons away from each other to thereby engage said brake lining material with said braking tracks, means for returning the pistons of said pair toward each other, said block having first and second abutment means respectively adjacent the opposite ends of said bore each having first and second surfaces spaced apart circumferentially of said drum to receive the associated brake lining material therebetween and disposed to be slidably engaged by respectively adjacent edges of said associated brake lining material to permit movement thereof with the associated piston toward and away from the associated braking track, said surfaces of said abutment means being disposed to retain the associated brake lining material against movement in a direction circumferentially of the associated track.

10. A dual track brake comprising a one-piece brake drum having a back and two concentric brake flanges extending in the same transverse direction from said back and terminating in free ends, said flanges respectively having first and second annular surfaces facing but separated radially from each other providing inner and outer braking tracks, means reinforcing said outer flange making the effective section of said outer flange greater at the free end thereof than the effective section of said inner flange at the free end thereof, a unitary cylinder block having a plurality of cylinder bores extending through the same with the axes of said cylinder bores intersecting each other at an acute angle, means for mounting said cylinder block between said flanges with the point of intersection of said bore axes at the center of curvature of said flanges, a pair of pistons in each of said cylinder bores, brake lining material coupled to each of said pistons at a portion thereof facing one of said braking tracks, means forming a fluid-tight seal between each said piston and the wall of the associated cylinder bore, each said pair of pistons and associated cylinder bore defining a fluid chamber therebetween for receiving hydraulic fluid adapted to be pressurized for moving the pistons of each said pair away from each other in the radial direction relative to said drum portions to engage said brake lining material with said braking tracks, means for returning the pistons of each said pair toward each other, and adjustable means having a portion between said pistons for adjusting the initial position thereof.

References Cited

UNITED STATES PATENTS

| | | |
|---|---|---|
| 1,511,976 | 10/1924 | Markham. |
| 1,785,203 | 12/1930 | Minium _____ 188—75 |
| 2,998,870 | 9/1961 | Herman et al. _____ 188—264 |
| 3,205,978 | 9/1965 | Broseke _____ 188—78 |

FOREIGN PATENTS 554,408    7/1943    Great Britain.

DUANE A. REGER, *Primary Examiner.*